United States Patent
Lambert

(10) Patent No.: US 8,959,718 B2
(45) Date of Patent: *Feb. 24, 2015

(54) PARALLEL OPENING HINGE

(71) Applicant: Securistyle Limited, Cheltenham (GB)

(72) Inventor: John F. Lambert, Cheltenham (GB)

(73) Assignee: Securistyle Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,335

(22) Filed: Mar. 27, 2013

(65) Prior Publication Data

US 2013/0279969 A1    Oct. 24, 2013

Related U.S. Application Data

(63) Continuation of application No. 13/293,589, filed on Nov. 10, 2011, now abandoned.

(51) Int. Cl.
| | | |
|---|---|---|
| E05D 15/34 | (2006.01) | |
| E05D 15/30 | (2006.01) | |
| E05D 15/44 | (2006.01) | |
| E05F 11/24 | (2006.01) | |
| E05D 15/00 | (2006.01) | |
| F16C 11/04 | (2006.01) | |
| E05D 15/10 | (2006.01) | |

(52) U.S. Cl.
CPC ............... *E05D 15/34* (2013.01); *E05D 15/30* (2013.01); *E05D 15/44* (2013.01); *E05F 11/24* (2013.01); *E05D 15/00* (2013.01); *F16C 11/04* (2013.01); *E05D 15/1013* (2013.01); *E05Y 2900/148* (2013.01)
USPC .................................. 16/366; 16/357; 16/370

(58) Field of Classification Search
CPC ......... E05D 15/30; E05D 15/44; E05D 15/00; E05D 15/46; E05D 15/466; E05D 3/14; E05D 3/18; E05D 3/186; E05D 15/34; E05D 15/1013; E05D 15/10; E05F 11/24; E05Y 2800/75
USPC ........... 16/366, 368, 369, 370, 357, 358, 359, 16/360, 361, 227; 49/405; 160/84.09, 160/84.11, 136
See application file for complete search history.

(56) References Cited

U.S. PATENT DOCUMENTS

| | | | |
|---|---|---|---|
| 1,484,093 | A | 2/1924 | Soss |
| 1,682,860 | A | 9/1928 | Soss |
| 1,687,271 | A | 10/1928 | Soss |
| 1,688,996 | A | 10/1928 | Soss |
| 1,693,004 | A | 11/1928 | Soss |
| 2,021,702 | A | 11/1935 | Soss |
| 2,040,279 | A | 5/1936 | Soss |
| 2,178,271 | A | 10/1939 | Soss |

(Continued)

FOREIGN PATENT DOCUMENTS

| | | |
|---|---|---|
| CH | 514768 | 12/1971 |
| DE | 2237669 A | 2/1973 |

(Continued)

*Primary Examiner* — Jefffrey O Brien
(74) *Attorney, Agent, or Firm* — Carl M Napolitano; GrayRobinson, P.A.

(57) ABSTRACT

A parallel opening hinge includes a pair of parallel hinges, each parallel hinge having a moveable pivot within a track of the parallel opening hinge, wherein a connector joins the two movable pivots in the track such that the movable pivots move together.

17 Claims, 5 Drawing Sheets

(56) References Cited

U.S. PATENT DOCUMENTS

| | | |
|---|---|---|
| 2,227,849 A | 1/1941 | Soss |
| 2,608,713 A | 9/1952 | Soss |
| 2,824,735 A | 2/1958 | Stavenau et al. |
| 2,964,341 A | 12/1960 | Doyle et al. |
| 2,983,948 A | 5/1961 | Simons |
| 3,001,224 A | 9/1961 | Soss |
| 3,098,647 A | 7/1963 | Teggelaar et al. |
| 3,234,584 A | 2/1966 | Valade |
| 3,508,362 A | 4/1970 | Wright |
| 3,881,221 A | 5/1975 | Schmidt |
| 4,622,715 A | 11/1986 | Buckley |
| 4,689,852 A | 9/1987 | Buckley |
| 4,718,144 A | 1/1988 | Buckley |
| 4,833,754 A | 5/1989 | Yang |
| 5,052,079 A | 10/1991 | Vosskoetter |
| 5,074,075 A | 12/1991 | Le See |
| 5,081,743 A | 1/1992 | Mayes |
| 5,097,629 A | 3/1992 | Guhl et al. |
| 5,205,074 A | 4/1993 | Guhl et al. |
| 5,272,837 A | 12/1993 | Nolte et al. |
| 5,435,103 A | 7/1995 | Iauesen et al. |
| RE35,635 E | 10/1997 | Bauman |
| 5,687,453 A | 11/1997 | Megregian et al. |
| 5,735,021 A | 4/1998 | Briggs |
| 5,794,310 A | 8/1998 | Dallmann |
| 5,832,668 A | 11/1998 | Faubert et al. |
| 5,898,977 A | 5/1999 | Muir |
| 5,964,011 A | 10/1999 | Ruston et al. |
| 6,044,587 A | 4/2000 | Vetter et al. |
| 6,050,115 A | 4/2000 | Schroter et al. |
| 6,061,870 A | 5/2000 | Dodge et al. |
| 6,112,371 A | 9/2000 | Tremblay |
| 2002/0013978 A1 | 2/2002 | Harkins et al. |
| 2002/0108212 A1 | 8/2002 | Carrier |
| 2003/0061683 A1 | 4/2003 | Migli |
| 2003/0213100 A1 | 11/2003 | Brain et al. |
| 2005/0011049 A1 | 1/2005 | Muir |
| 2005/0223524 A1 | 10/2005 | Muir |
| 2005/0262664 A1 | 12/2005 | Smith |

FOREIGN PATENT DOCUMENTS

| | | | |
|---|---|---|---|
| DE | 9214897 | 4/1993 | |
| DE | 4325174 | 5/1994 | |
| DE | 19741728 A | 4/1999 | |
| EP | 0199578 A | 10/1986 | |
| EP | 0968349 A | 1/2000 | |
| EP | 1288417 A | 3/2003 | |
| GB | 220905 A | 8/1924 | |
| GB | 435915 A | 10/1935 | |
| GB | 2069037 A | 8/1981 | |
| GB | 2149450 A | 6/1985 | |
| GB | 2217778 A | 11/1989 | |
| GB | 2225050 A | 5/1990 | |
| GB | 2228973 A | 9/1990 | |
| GB | 2281098 A * | 2/1995 | |
| GB | 2333123 A | 7/1999 | |
| GB | 2379248 A | 3/2003 | |
| JP | 02261183 A * | 10/1990 | E05F 7/04 |
| WO | 9842941 A | 10/1998 | |
| WO | 9915750 | 4/1999 | |

* cited by examiner

PARALLEL OPENING HINGE

CROSS-REFERENCE TO RELATED APPLICATIONS

This application claims the benefit of and is a continuation of U.S. application Ser. No. 13/293,589, filed Nov. 10, 2011 and now abandoned, which is a continuation of U.S. application Ser. No. 12/293,007, filed Sep. 15, 2008 through a National Phase Entry from International Patent Application PCT/GB2007/000817, having an international filing date of Mar. 12, 2007 and issuing as U.S. Pat. No. 8,087,129, which itself claims benefit of GB0605364.9 filed Mar. 16, 2006 and GB0613380.5 filed Jul. 5, 2006, the disclosures of which are hereby incorporated by reference herein in their entireties, and all commonly owned.

FIELD OF THE INVENTION

The present invention generally relates to hinges, and in particular relates to parallel opening hinges and improvements thereto.

BACKGROUND OF THE INVENTION

Parallel opening hinges are well known, as illustrated by way of example to European Patent No. 0968349 for a vent, the disclosure of which is herein incorporated by reference in its entirety.

When a heavy window sash, say perhaps between 100-200 kilograms in weight, is to be supported for opening parallel to a fixed frame, a number of parallel opening hinges are typically used. For example, the long sides of the vent may use two or even more separate parallel hinges and the shorter sides of the vent may use one or two separate parallel hinges to support and control the opening of the vent. Although these systems work, it has been noted that the weight of a sash can cause a certain amount of dropping and falling out of the upper part of the sash relatively to the fixed frame. This can result in the vent opening out of parallel and being unsightly, and is certainly not ideal. Also, due to the weight of sashes now being carried by parallel hinges, a certain degree of "crabbing" can occur as a slider moves along a track of a parallel hinge during opening and/or closing of the vent. Once again, this is not ideal and essentially spoils the smooth running of the hinge system whether it is driven by manual operation or an electric motor. It has also been noted that too much free play in a central pivot joint between two links of a parallel opening hinge can also reduce the smooth operation of the hinge system.

SUMMARY OF THE INVENTION

The present invention improves upon well know hinges and solves the above described problems by providing a new parallel opening hinge system and a number of component parts therefor. In view of the foregoing, the present invention provides a parallel opening hinge system that may comprise a first track, a second track and at least two pairs of pivotally connected links, wherein each pair of pivotally connected links is mounted to the tracks via a fixed pivot and a movable pivot in each track, and wherein a connector joins two movable pivots in a track such that the movable pivots move together.

By causing the two movable pivots of what are essentially adjacent parallel hinges to move together, the top part of a sash is prevented from falling outwards. Indeed, the use of the connector results in both parallel hinges moving at the same time to the same extent, thereby resulting in almost perfect parallel opening of a vent.

Although the present invention will function with only one connector acting in one track of a parallel opening hinge arrangement, improved opening may result if each track of a parallel opening hinge system has its own connector for joining movable pivots in its respective track. Furthermore, if more than two parallel hinges are accommodated in a pair of tracks, a connector can act between two or more of the movable pivots in each parallel track.

In an embodiment of a parallel opening hinge, the movable pivots are desirably slider blocks which are accommodated within the track. As will be appreciated, the connector may be a tie bar attached to the movable pivots, wherein the tie bar is situated and moved within the track. Alternatively, it would be possible for the connector to be connected to a movable pivot and pass out of the bottom of the track and along the underside of the track before re-entering the track to connect to the next movable pivot.

If the connector is accommodated within a track, the connector may slots to accommodate other components, such as other pivot points and screw mounting heads for example, within the hinge.

The connector may be attached to a movable pivot via a rivet. Alternatively, the connector may be attached to a movable pivot via a shaped connection, such as a jigsaw type arrangement, or a snap-fit, for example. Other forms of connection will, of course, be appreciated by those skilled in the relevant art.

The track may desirably have a base and two side walls having inwardly facing flanges substantially parallel to the base. This is a typical C-shaped cross-section track known in the prior art. As will be appreciated, the flanges retain the movable pivots/slider blocks within the track.

The present invention further provides a new and improved mounting block for use in a track of a hinge, the mounting block being shaped to be received and retained within the track, wherein the mounting block includes a plurality of roller balls for abutting the track in use.

Typical slider blocks were able to move freely along a track and provided good support for a sash. However, now that much heavier sashes are being supported, it has been necessary to invent a new form of mounting block, and this has resulted in the present invention which uses roller balls.

The mounting block may include at least one aperture for receiving a pivot pin to connect the block to a link of a hinge. The block may also include a second aperture for receiving a connector to link the mounting block to another mounting block in a parallel opening hinge system as herein described. Alternatively, some other connection arrangement may be provided on the mounting block.

The mounting block may further include a body and a skin overlaying the body to prevent the body from contacting the track in use. This is particularly useful when the body is manufactured from metal and the skin is a plastics skin, since not only does the plastics skin result in less friction between the mounting block and the track, but the plastics skin can readily incorporate cut out regions to accommodate the roller balls. Thus, the roller balls can abut both the metal track and the metal body of the mounting block, to transfer the weight of the sash directly therebetween.

In one embodiment according to the teachings of the present invention, the mounting block is substantially rectangular and the roller balls are located towards the four corners of the mounting block on the sides of the block which abut the sides of the track. If appropriate, more than four roller balls may be incorporated.

The roller balls are preferably manufactured from metal, but some other suitable material could alternatively be used.

The present invention further provides a pivot mount for a link of a hinge. The pivot mount comprises a support block and a pivot pin engaging the support block, wherein the pivot pin includes a cam surface for abutting a link of a hinge in use to move the link relative to the block.

By incorporating a pivot mount of this kind in a hinge, particularly a parallel opening hinge, any dropping of the sash relative to the fixed frame can be accommodated during installation by adjusting the cam position to lift the sash. This has been found to be a surprisingly useful invention.

The pivot pin has a shaft for engaging the support block.

The cam surface is generally circular and offset from the axis of the shaft of the pivot pin. Further, the diameter of the circle defining the cam surface is preferably larger than the diameter of the shaft of the pivot pin, thereby allowing a significant amount of movement of a sash mounted on the parallel opening hinge to be achieved. Essentially, rotation of the cam surface adjusts the position of the track carrying the sash relative to the remainder of the parallel hinge.

The pivot pin may include a head for retaining a link on the block, in use. One or more washer may also be used, as necessary. Further, the head of the pivot pin may be shaped to receive a tool, such as an Allen key or screw driver, to rotate the pivot pin during installation.

The present invention also provides a hinge for a vent incorporating a mounting block and/or a pivot mount as described and claimed herein.

As mentioned above, the central pivot joint between two links of a parallel opening hinge can provide a region of too much free play, which can be detrimental to the functioning of the parallel opening hinge. Thus, the present invention further provides a pivot between two links of a hinge, the pivot including a fastener holding the links together, and bush (also well known as a bushing) acting on the fastener to define spacing between the links. By including the bush, which is ideally a good fit through the links, a pivot arrangement is produced wherein axial free play along the fastener can be minimised. As a result, smoother operation of the pivot can result, thereby improving the opening of a parallel hinge, for example.

The bush includes a shoulder for abutting a surface of a link. The surface of the link includes a recessed surface, so that both the shoulder of the bush and the associated part of the fastener can be accommodated within the recess.

At the other end of the bush, the bush abuts a head of the fastener, thereby defining the length of the fastener during assembly. The head of the fastener is accommodated in a recess in one of the links. Thus, the complete pivot can be accommodated within the profile of the two adjacent links.

The fastener passes through the bush and, if the fastener is a rivet, is crushed outwardly and over the shoulder of the bush during assembly.

The bush is rigid and acts as a bearing for the two links. Phosphor bronze is a very good bearing material, which also has good strength and rigidity. Other suitable materials can, of course, alternatively be used. As will be appreciated, a washer is ideally used between the two links outside the bush to prevent wear between the links. Hence, the bush has sufficient length to accommodate this washer, which may be formed from a nylon or other suitable material.

BRIEF DESCRIPTION OF THE DRAWINGS

Specific embodiments of the present invention are now described, by way of example only, with reference to the accompanying drawings in which.

DETAILED DESCRIPTION OF EMBODIMENTS

Figure 1:
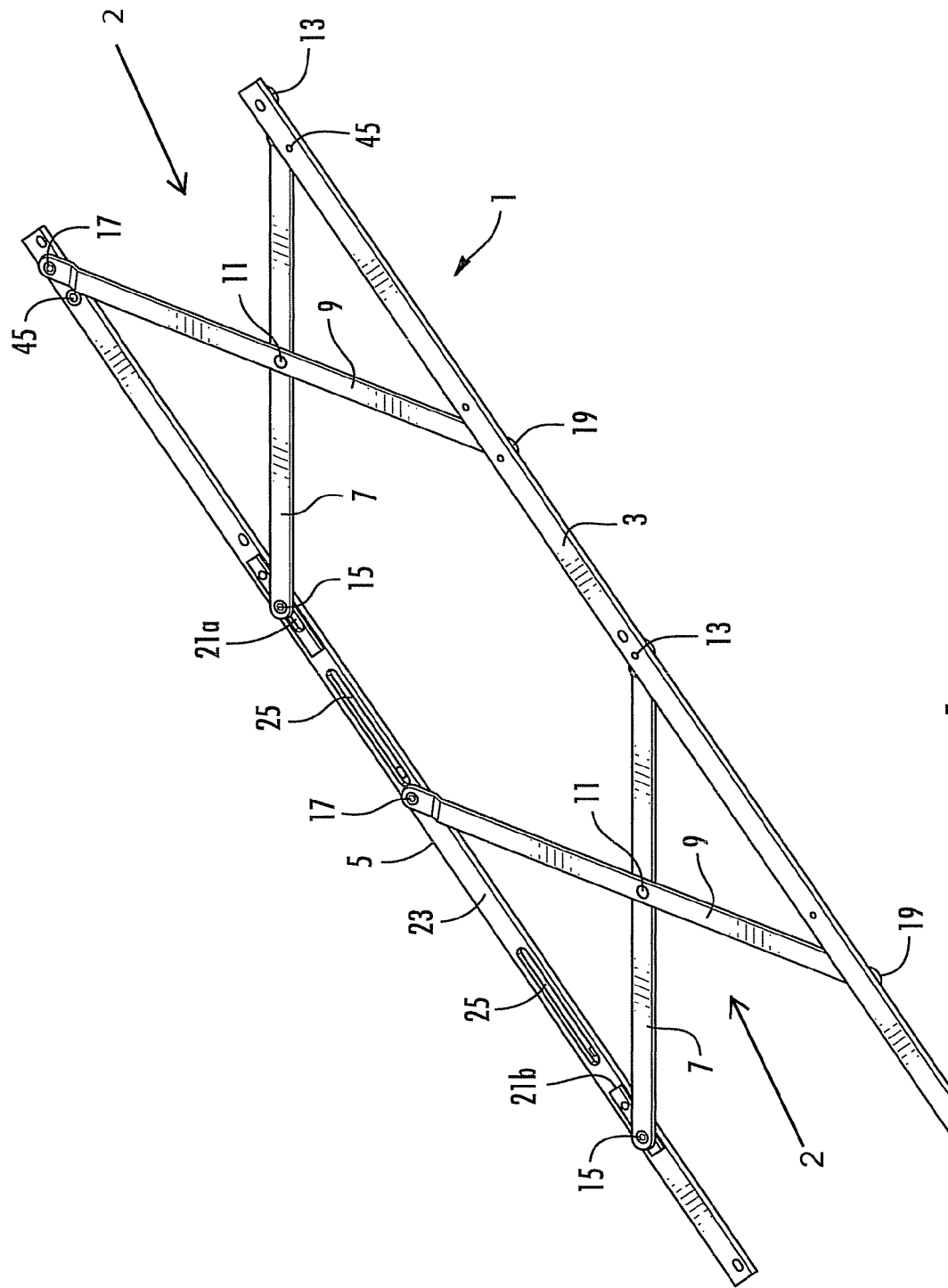
FIG. 1 is a perspective view of a parallel opening hinge according to the present invention in an open position.
Figure 2:
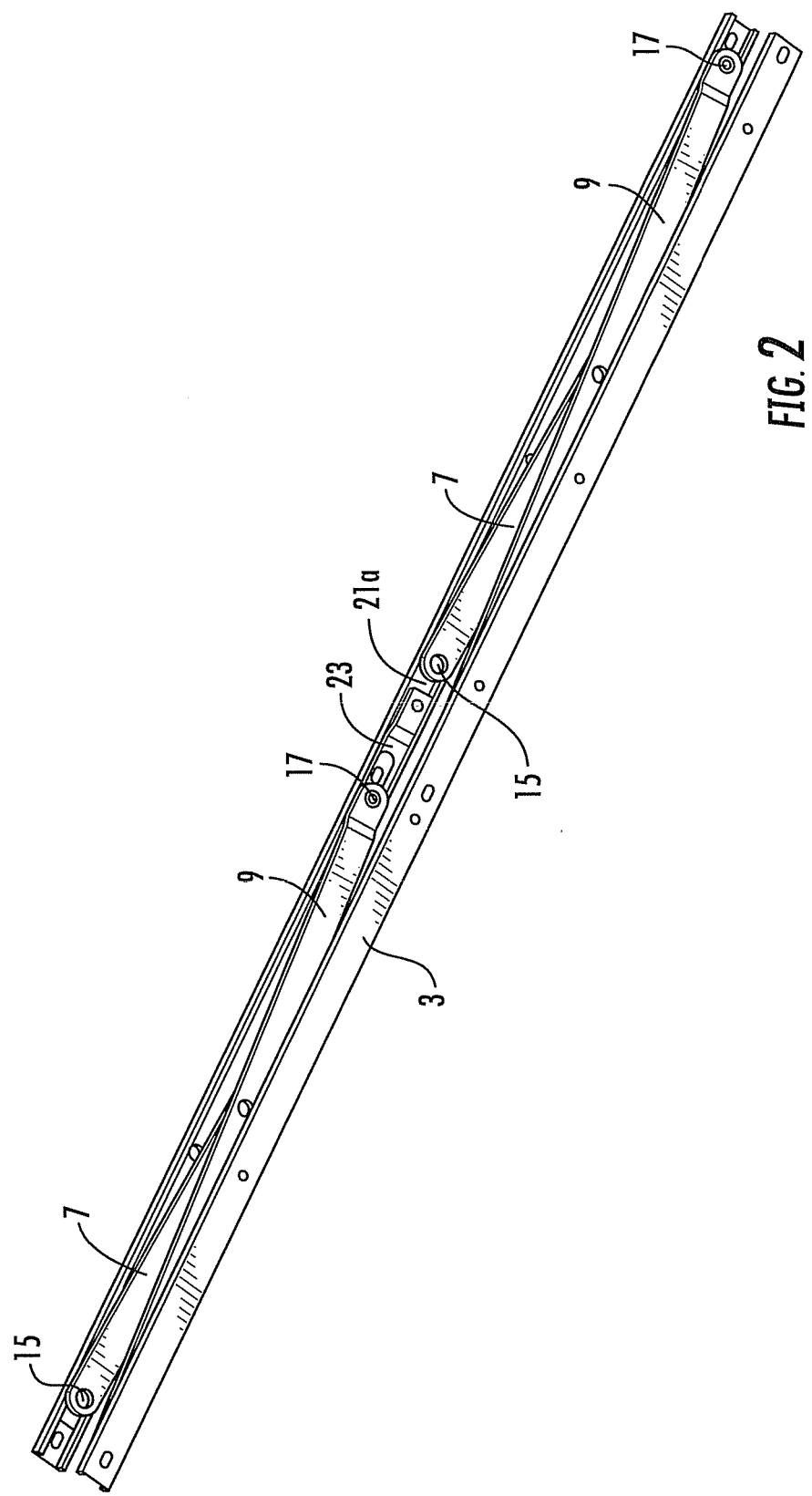
FIG. 2 is a perspective view of the hinge of FIG. 1 in a closed position.

With reference to FIGS. 1 and 2 of the accompanying drawings, a parallel opening hinge system 1 is shown. As will be seen, the hinge system 1 effectively incorporates two parallel hinge arrangements 2 in a single product. The new parallel opening hinge system 1 includes a pair of parallel tracks 3, 5 each having essentially a C-shaped cross-section with a base and two side walls having inwardly facing flanges substantially parallel to the base. The parallel opening hinge system 1 further includes two pairs of crossing links 7, 9, wherein each pair of crossing links 7, 9 is pivotally connected at a picot 11 and to each track 3, 5. The links 7 are attached to track 3 at fixed pivot points 13 and to track 5 at movable pivot points 15. Similarly, the links 9 are attached to track 5 at fixed pivot points 17 and to track 3 at movable pivot points 19. Thus, as the parallel tracks 3, 5 are moved together or apart, the movable pivots 15, 19 travel along the tracks whereas the fixed pivots 13, 17 remain fixed.

Figure 3:
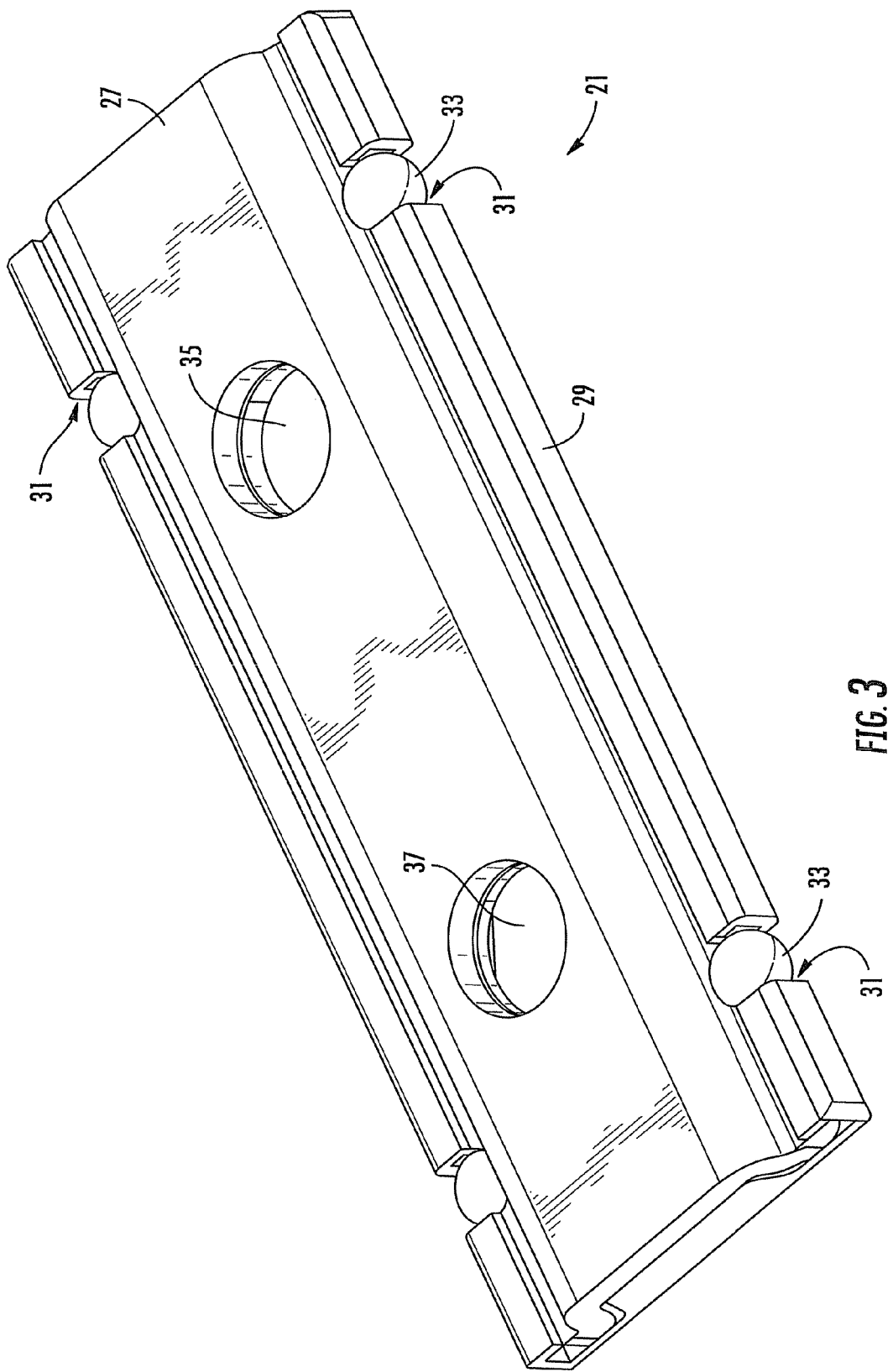
FIG. 3 is a perspective view of a mounting block according to the present invention.
Figure 4:
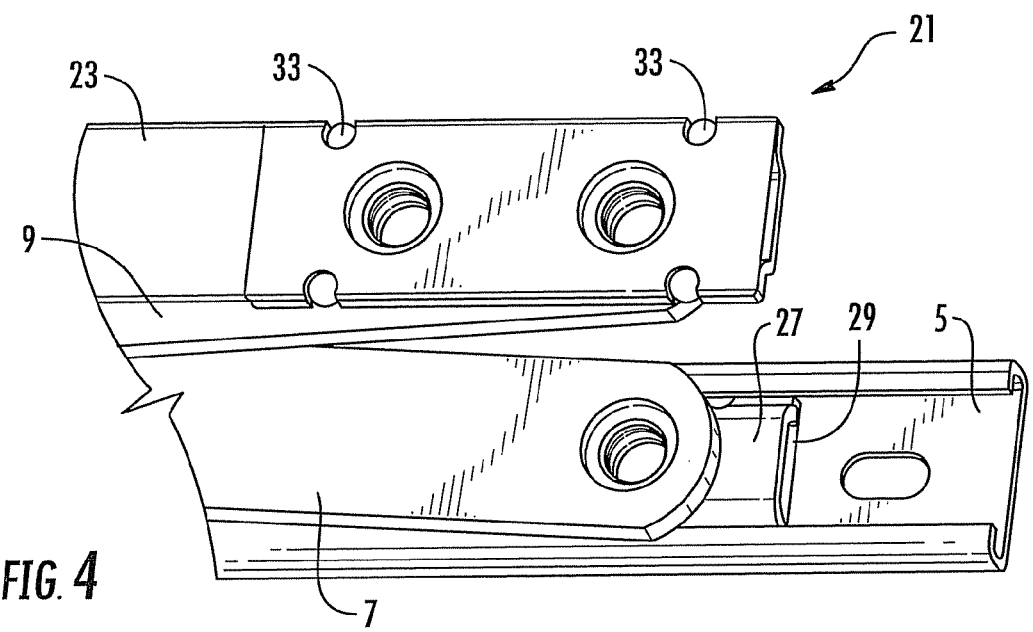
FIG. 4 is a perspective view showing a part of a parallel opening hinge with one of the tracks removed to show the mounting block of FIG. 3 in use.

As will be seen in FIG. 1, the movable pivots 15 are carried by mounting blocks 21 shown in more detail in FIGS. 3 and 4. These mounting blocks 21 are shaped to be received and retained within the c-shaped cross-sectioned tracks 3, 5. Between the two mounting blocks 21 in track 5, for example, a connector or tie rod 23 is provided for tying the two sliders 21 together, so that they move as one. The connector 23 is joggled at one end to ride over the mounting block 21 and be riveted thereto. The connector 23 then travels along the bottom of the track 5 avoiding pivot 17 by virtue of a slot 25 in the connector 23 before being connected to mounting block 21*b* in track 5. The connection with mounting block 21*b* can be a snap fit or a jigsaw type arrangement where the two components are shaped complementary, for example.

Also not shown in FIG. 1, a similar connector 23 can be used between the movable pivots 19 in track 3.

Turning now to FIGS. 3 and 4, the mounting block 21 is shown in more detail.

As will be appreciated, a metal body portion 27 is shaped to be received in a generally C-shaped cross-section track 3, 5 and is partially encased in plastics skin 29. This arrangement is not dissimilar to that described and claimed in the present applicant's UK patent 2281098. The difference here, however, is that the plastics skin 29 has four cut out regions 31 for receiving metal roller balls 33. The roller balls 33 are sized to be received in a space between the flanges and the base of track 3, 5. The roller ball 33 stand slightly proud of the plastics skin 29, thereby abutting and running along the tracks 3, 5. Smoother running of the mounting blocks along the tracks 3, 5 thereby results. More roller balls 33 could, of course, be used in additional cut outs 31, if necessary.

Each mounting block 21 includes two apertures, 35, 37. One aperture is used to accommodate the pivots 15, and the other aperture is used to connect to the connector 23. Thus, the two mounting blocks 21a, 21b face each other in track 5 with their free apertures facing each other as shown in FIG. 1.

Figure 5:
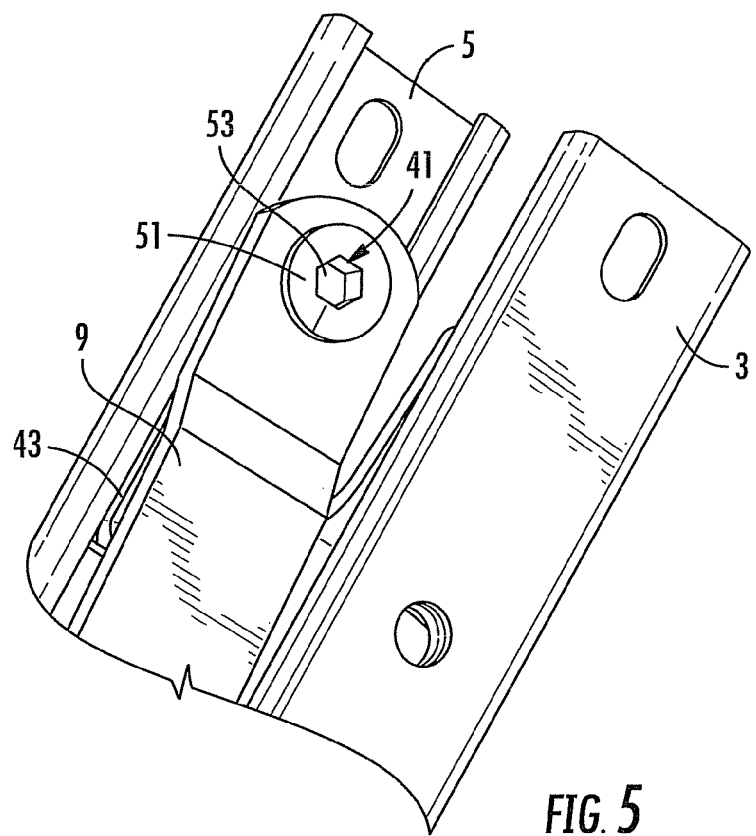
FIG. 5 is a perspective view of part of the parallel opening hinge of FIGS. 1 and 2 showing a pivot mount according to the present invention.
Figure 6:
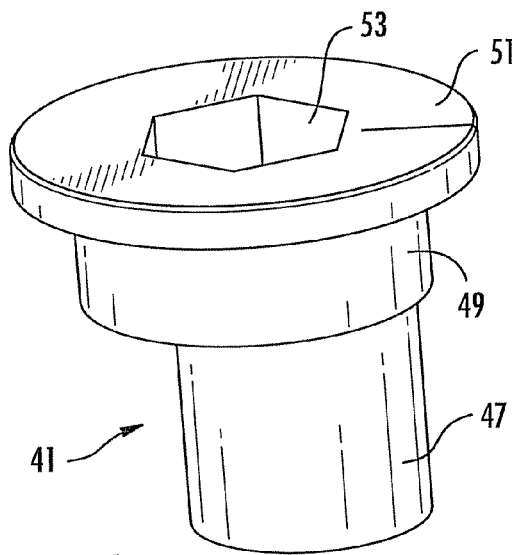
FIG. 6 is a perspective view of a pivot pin for use in the pivot mount shown in FIG. 5.
Figure 7:
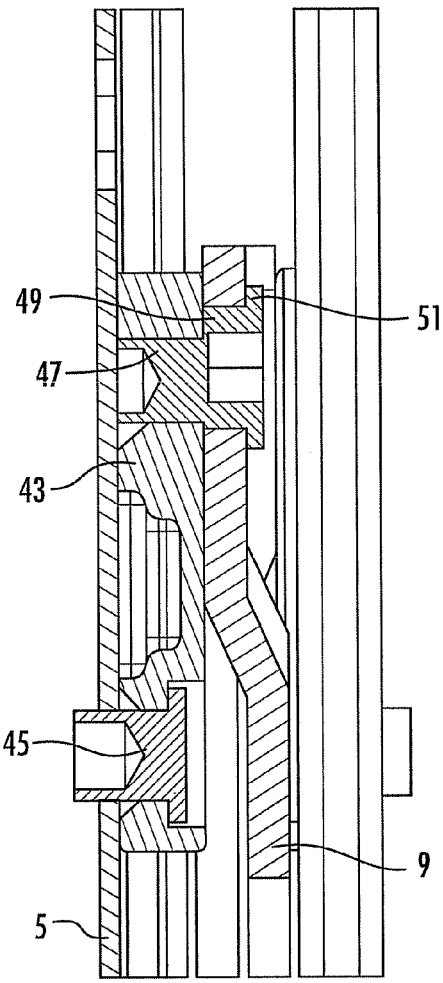
FIG. 7 is a cross-sectional view through the pivot mount shown in FIG. 5.

Moving on to a further inventive aspect of the present parallel opening hinge system, a pivot mount is shown in FIGS. 6 and 7. The pivot mount of FIG. 5 is an enlarged view of the area surrounding pivot 17 in FIG. 1. As will be seen, a pivot pin 41 retains a link 9 on a support block 43, which is fixed within track 5. The support block 43 is fixed to the track 5 by means of a rivet 45 seen more easily in FIG. 1. The pivot pin 41 is fixed to the support block 43, but free to rotate relative thereto about a shaft 47. The pivot pin 41 also includes a cam surface 49 for rebutting an aperture (not shown) in the link 9. A head 51 is provided on the pivot pin to retain the link 9 connected to the support block 43. The head 51 includes a recess 53 for accommodating an Allen key or the like to rotate the pivot pin 41 relative to the support block 43.

During installation of a parallel hinge according to the present invention, the sash mounted on the track 5 may drop slightly due to its weight and become non-parallel to the fixed frame, and thereby look unsightly. To overcome this, an Allen key can be applied to the recess 53 in the head 51 of each pivot mount to rotate the pivot pin 41 about shaft 49, thereby bringing the cam surface 49 to bear against the link 9. Relative motion of the link 9 and support block 43, and hence track 5 and the sash thereby results, lifting (or lowering) the sash as required. Essentially perfect parallel positioning and alignment of the sash relative to the fixed frame can thereby result.

Figure 8:
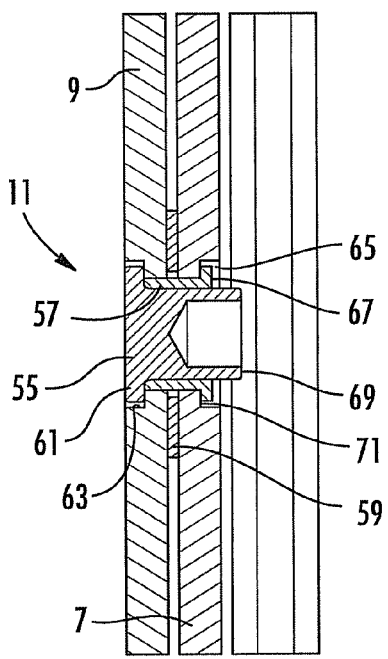
FIG. 8 is a cross-sectional view through a pivot joining crossing links of a parallel opening hinge.

With reference to FIGS. 1 and 8, the pivot 11 between the crossing links 7, 9 comprises a rivet 55, a bush 57 (also known as a bushing) and a nylon washer 59. As will be seen, the rivet has a head 61 accommodated within a recess 63 in link 9 and the fastener passes through the bush 57. The other link 7 also includes a recess 65 for accommodating a shoulder 67 of the bush 57 and the free end 69 of the rivet 55 when crushed over the shoulder 67 of the bush 55. Following crushing of the rivet 55, the rivet is accommodated within the combined thickness of the two links 7, 9 and the washer 59. Further, due to the shoulder 67 of the bush 57 bearing against a surface 71 in the recess 65 of link 7, the location of the bush 57 is defined and the active length of the rivet 55 is fixed due to the axial length of the bush 57. With this in mind, as will be seen in FIG. 8, the free end of the bush 57 abuts the head 61 of the rivet 55, so the distance between the two links 7, 9 can be predefined by choosing the length of the bush 57. The thickness of the nylon washer 59 can also be selected to ensure that the two links 7, 9 are able to rotate freely about the phosphor bronze bush 57 with little axial free play along the rivet 55. An improved pivot joint having less friction is thereby produced, which results in the opening and closing forces of the vent being reduced. Larger and heavier vents can therefore be manually operated.

As will be appreciated, there are a number of novel and inventive features described herein which, when used in a hinge, such as a parallel opening hinge, will result in significantly improved opening and usage of the hinge.

It will of course be understood that the present invention has been described above purely by way of example, and that modifications of detail can be made within the scope of the invention as claimed.

That which is claimed is:

1. A parallel opening hinge system comprising a plurality of parallel hinge arrangements, each parallel hinge arrangement having a moveable pivot within a track of the parallel opening hinge system, wherein the hinge arrangements are adapted to connect the track to a mounting member, wherein the track is adapted to remain parallel to the mounting member throughout a range of movement of the plurality of parallel hinge arrangements, wherein a connector joins the movable pivots in the track such that the movable pivots move together, and wherein the connector is situated and moves within the track and extends along a line of movement of the two moveable pivots.

2. A parallel opening hinge system according to claim 1, wherein the movable pivots are slider blocks.

3. A parallel opening hinge system according to claim 1, wherein the connector is a tie bar attached to the movable pivots.

4. A parallel opening hinge system according to claim 1, wherein the connector has slots to accommodate other components within the track.

5. A parallel opening hinge system according to claim 1, wherein the connector is attached to the movable pivot via a rivet.

6. A parallel opening hinge system according to claim 1, wherein the connector is attached to the movable pivot via a shaped connection or snap fit.

7. A parallel opening hinge system according to claim 1, wherein the track has a base and two side walls having inwardly facing flanges substantially parallel to the base.

8. A parallel opening hinge system according to claim 2, wherein each slider block includes at least one aperture for receiving a pivot pin to connect the slider block to a link of a hinge.

9. A parallel opening hinge system according to claim 8, wherein the slider block includes a body and a skin overlaying the body to prevent the body from contacting the track in use.

10. A parallel opening hinge system according to claim 9, wherein the body is manufactured from metal and the skin is a plastics skin.

11. A parallel opening hinge system comprising:
  at least one track;
  a plurality of parallel hinge arrangements pivotally connected to the at least one track, wherein the hinge arrangements are adapted to connect the at least one track to a mounting member, wherein the at least one track is adapted to remain parallel to the mounting member throughout a range of movement of the plurality of parallel hinge arrangements, and wherein each parallel hinge arrangement includes a moveable pivot operable with the at least one track; and
  a connector within the at least one tracks connecting the movable pivots within the at least one track such that the movable pivots move together within the at least one track, wherein the connector is situated and moves within the at least one track and extends along a line of movement of the two moveable pivots.

12. A parallel opening hinge system according to claim 11, wherein at least one of the parallel hinge arrangements comprises a first link connected to the at least one track and a fixed pivot thereto.

13. A parallel opening hinge system according to claim 12, further comprising a second link pivotally connected to the first link and to the movable pivot.

14. A parallel opening hinge system according to claim 13, wherein the second link and the first link form crossing links.

15. A parallel opening hinge system comprising:
- a track having a base and two side walls having inwardly facing flanges substantially parallel to the base;
- a plurality of parallel hinge arrangements, each parallel hinge arrangement having a moveable pivot within the track, wherein the hinge arrangements are adapted to connect the track to a mounting member, and wherein the track is adapted to remain parallel to the mounting member throughout a range of movement of the plurality of parallel hinge arrangements;
- a connector joining the movable pivots in the track such that the movable pivots move together, wherein the connector is situated and moves within the track and extends along a line of movement of the two moveable pivots.

16. A parallel opening hinge system according to claim 15, wherein the movable pivots are slider blocks moveably secured within the track.

17. A parallel opening hinge system according to claim 16, wherein the slider block includes a body and a skin overlaying the body, and wherein the skin slidably contacts the track in use.

* * * * *